United States Patent [19]

Goshima et al.

[11] 4,201,147
[45] May 6, 1980

[54] TIRE PRESSURE DROP WARNING APPARATUS

[75] Inventors: Norio Goshima, Musashino; Akira Matsuda, Higashimurayama, both of Japan

[73] Assignee: Bridgestone Tire Company Limited, Tokyo, Japan

[21] Appl. No.: 971,214

[22] Filed: Dec. 20, 1978

[30] Foreign Application Priority Data

Dec. 26, 1977 [JP] Japan ............................. 52-156939

[51] Int. Cl.² ............................................ B60C 23/04
[52] U.S. Cl. ....................................... 116/34 B; 16/70
[58] Field of Search ................ 116/34 B, 34 R, 70, 116/34 A; 340/58; 200/61.23

[56] References Cited

U.S. PATENT DOCUMENTS

| 3,030,911 | 4/1962 | Dilts | 116/34 R |
| 3,593,269 | 7/1971 | Richardson | 340/58 |
| 4,117,452 | 9/1978 | Snyder | 340/58 |

FOREIGN PATENT DOCUMENTS 313393  6/1929  United Kingdom .................. 116/34 B Primary Examiner—S. Clement Swisher
Assistant Examiner—Denis E. Corr
Attorney, Agent, or Firm—Cushman, Darby & Cushman

[57] ABSTRACT

This invention is concerned with a tire pressure drop audible warning-giving apparatus, which is provided in an air chamber defined by a pneumatic tire and a wheel rim assembled with the pneumatic tire so as to strike the wheel rim for emitting an alarming sound when a tire inner pressure is dropped in the air chamber below an allowable limit. The apparatus comprises in combination: a securing member secured to the wheel rim; a blow hammer provided spacedly from the securing member in the direction perpendicular to the radial direction of the wheel rim; and a connecting member made of a resilient material and having one end connected with the radially outer end of the securing member and the other end connected with the blow hammer; wherein the blow hammer has at its radially outer end a protrusion extending radially outwardly from the radially outer end of the connecting member, and at its radially inner end a blow portion.

4 Claims, 8 Drawing Figures

U.S. Patent  May 6, 1980  Sheet 1 of 3  4,201,147
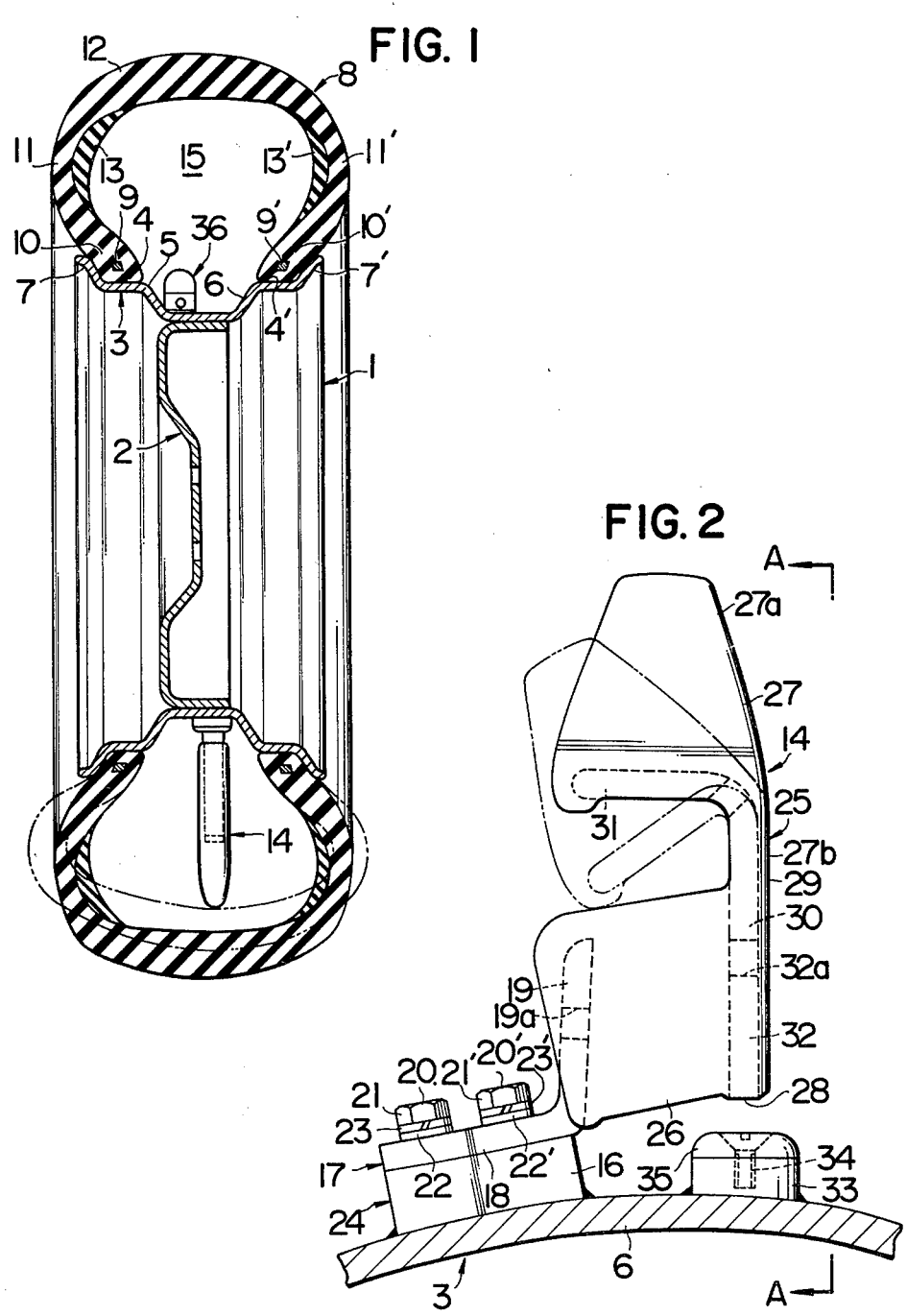

TIRE PRESSURE DROP WARNING APPARATUS

This invention relates to a tire pressure drop alarming apparatus, and in particular to an apparatus which is provided in an air chamber defined by a pneumatic tire and a wheel rim assembled with the pneumatic tire so as to strike the wheel rim for emitting an alarming sound when a tire inner pressure is dropped in the air chamber below an allowable limit.

Conventionally, there has been proposed by British Pat. No. 1,447,244 one of such tire pressure drop alarming apparatuses which comprises a metal cylinder secured to the wheel rim to extend radially of the wheel rim, and a metal piston slidably received in the cylinder so that when the tire inner pressure is dropped in the air chamber below the allowable limit, the tire is deformed to radially inwardly urge the piston, thereby enabling the piston to collide with the wheel rim and emit an alarming sound. With the conventional alarming apparatus, the piston receives three dimensional forces caused by the deformation of the tire when the piston is radially inwardly urged so that the cylinder is similarly deformed accompanying by the three dimensional precession motion of the piston. As a consequence, there occurs such a drawback that the piston can not slidably be moved in the cylinder to emit the alarming sound. Although it may be considered to enlarge the thickness of the cylinder to make it strong, in this case the cylinder can not be deformed so that the inner surface of the tire is collided with the piston with an extremely large force to damage the inner surface of the tire, and it is impossible to effect an unbalance adjustment of a vehicle wheel as the cylinder becomes large in weight. Another tire pressure drop alarming apparatus also has been proposed to comprise a bracket secured to the wheel rim to extend radially, a blow arm pivotally supported by the bracket through a pivotal pin and having at its one end a blow portion, and a spring for always swinging the blow arm to bring the blow portion of the blow arm into engagement with the wheel rim, so that when the tire inner pressure is dropped below the allowable limit and the blow arm comes to a position just above a ground surface, the tire is deformed and the blow arm is swung to urge the other end of the blow arm toward the wheel rim against the spring, and that when the blow arm is spaced from the ground surface, the blow arm is swung by the action of the spring to cause the blow portion to strike the wheel rim. Since the foregoing alarming apparatus is adapted to strike the wheel rim with the reaction of the spring to emit the alarming sound, the alarming sound may be cancelled by noises of the automobile during a high speed running thereof even if an extremely tenacious spring may be employed. Further, the blow arm is swung 10 to 15 times per second so that the pivotal pin and the spring may be instantly broken. Although it may be considered to make the spring extremely tenacious, in this case there occur such drawbacks that the blow arm collides with the inner surface of the tire with an extremely large force when the tire swings the blow arm against the spring, resulting in damaging the inner surface of the tire.

In order to overcome the above drawbacks, there has been proposed another tire pressure drop alarming apparatus which comprises a rim attachment secured to the wheel rim, a bush secured at its radially inner end to the rim attachment to radially outwardly extend and made of a resilient elastomer, and a blow arm having a head portion secured to the radially outer end of the bush to be engaged with the wheel rim and a tread engaging portion engaged with the inner surface of the tire. When the tire inner pressure is dropped in the air chamber below the allowable limit the tire is deformed to cause the inner surface of the tire to be in pressed engagement with the tread engaging portion so that the bush is deformed and thus the head portion strikes the wheel rim. With the above alarming apparatus, the bush does the precession motion and is bendingly deformed by the three dimentional forces in the case that the bush is made higher so as to easily perceive the deformation of the tire. As the result, the head portion does not necessarily strike the wheel rim, which results in lowering reliability of the alarming apparatus. Moreover, the bush may be broken or damaged prior to hearing of the blow sound of the wheel rim by the driver due to its violent precession motion during the high speed running so that the alarming apparatus can not be used practically.

It is therefore an object of the present invention to provide a tire pressure drop alarming apparatus which overcomes the previously mentioned drawbacks and is made inexpensively and reliably.

The tire pressure drop alarming apparatus according to the present invention is provided in an air chamber defined by a pneumatic tire and a wheel rim assembled with the pneumatic tire so as to strike the wheel rim for emitting an alarming sound when a tire inner pressure is dropped in the air chamber below an allowable limit. The apparatus comprises in combination: a securing member secured to the wheel rim; a blow hammer provided spacedly from the securing member in the direction perpendicular to the radial direction of the wheel rim; and a connecting member made of a resilient material and having one end connected with the radially outer end of the securing member and the other end connected with the blow hammer; wherein the blow hammer having at its radially outer end a protrusion extending radially outwardly from the radially outer end of the connecting member, and at its radially inner end a blow portion, whereby the inner surface of the pneumatic tire is periodically brought into pressed engagement with the radially outer end of the protrusion to cause the connecting member to be shearingly and bendingly deformed when the tire inner pressure is dropped in the air chamber below the allowable limit so that the blow portion can strike the wheel rim to emit the alarming sound.

The above and other objects, features and advantages of the present invention will become clear from the following particular description of the invention and the appended claims, taken in conjunction with the accompanying drawings which show by way of example a preferred embodiment of the present invention.

In the accompanying drawings:

FIG. 1 is a cross-sectional view of one preferred embodiment of a tire pressure drop alarming apparatus according to the present invention and showing a pneumatic tire and a wheel rim assembled with the pneumatic tire and the alarming apparatus;

FIG. 2 is an enlarged elevational view of the alarming apparatus;

Figure 3:
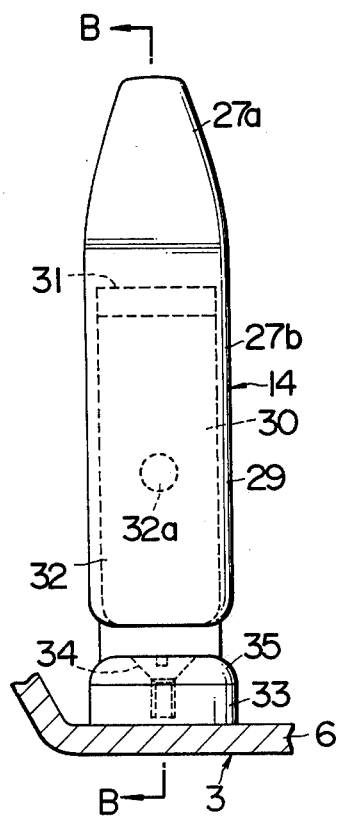
FIG. 3 is a view as seen from the lines A—A of FIG. 2.

Referring now to the drawings, and in particular to FIG. 1, the reference numeral 1 generally designates a wheel rim which comprises a disc 2 to be secured to a drive shaft of an automobile not shown, and a rim 3 having an inner periphery secured to the outer periphery of the disc 2. The rim 3 comprises a pair of annular bead seats 4 and 4' spaced away from each other in the axial direction of the drive shaft, a flat base portion 5 cylindrically formed to be interposed between and securely connecting the bead seats 4 and 4', a rim well portion 6 formed at the flat base portion 5 to have a diameter smaller than that of the flat base portion 5, and a pair of flange portions 7 and 7' having their inner peripheries integrally formed with the axially outer ends of the bead seats 4 and 4', respectively and extending radially outwardly. A pneumatic tire 8 comprises a pair of bead portions 10 and 10' respectively having beads 9 and 9' embedded therein, a pair of side wall portions 11 and 11' integrally formed with the bead portions 10 and 10' and extending radially outwardly, a tread portion 12 having axial ends integrally connected with the radially outer ends of the side wall portions 11 and 11', and a pair of annular reinforcing portions 13 and 13' adhered to the inner faces of the side wall portions 11 and 11', respectively, and each having a rigidity larger than that of each of the side wall portions 11 and 11'. The pneumatic tire 8 is assembled with the wheel rim 1 with the bead portions 10 and 10' respectively resting on the bead seats 4 and 4' of the wheel rim 1.

Figure 4:
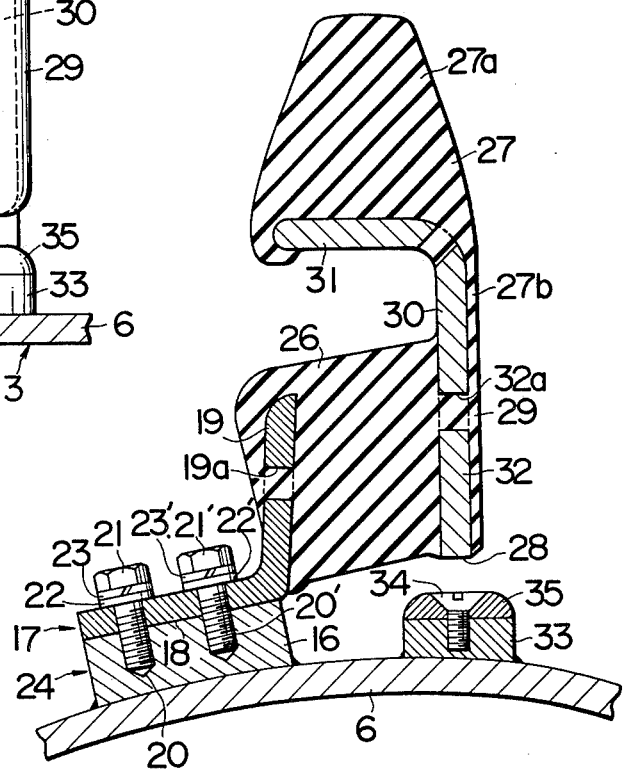
FIG. 4 is a cross-sectional view taken along the lines B—B of FIG. 3.

The reference numeral 14 generally indicates only one tire pressure drop alarming apparatus according to the present invention which is provided within an air chamber 15 defined by the pneumatic tire 8 and the wheel rim 1 and which comprises a square cross-sectioned supporting base 16 made of a metal and welded to the outer circumferential face of the trim well portion 6 in the vicinity of the bead seat 4' of the rim 3 as shown in FIGS. 2, 3 and 4. The reference numeral 17 generally represents a supporting plate made of a metal and comprising a flat base portion 18, and a vertical portion 19 integrally formed with the flat base portion 18 to extend substantially perpendicularly to the flat base portion 18 so that the supporting plate 17 is formed as a whole in a L-shaped. The supporting plate 17 is secured to the supporting base 16 by means of bolts 20 and 20' with the flat base portion 18 in contact with the supporting base 16. Between head portions 21 and 21' of the bolts 20 and 20' and the flat base portion 18 are interposed washers 22, 22' and spring washers 23, 23' so that the bolts 20 and 20' may not be loosen by oscillation, shock and the like. The previously mentioned supporting base 16 and the supporting plate 17 constitute as a whole a securing member generally indicated by the reference numeral 24.

The reference numeral 25 generally denotes a blow hammer which is provided at a position circumferentially spaced from the securing member 24. A connecting member 26 made of a resilient material such as rubber has one end securely connected with the vertical portion 19, i.e., radially outer end portion of the securing member 24 and the other end integrally connected with the blow hammer 25. The connection of the connecting member 26 with the securing member 24 and the blow hammer 25 is made by an adhesive or a method of simultaneous vulcanization. The vertical portion 19 is formed with an aperture 19a which allows the resilient material of the connecting member 26 to enter therein so as to firmly connect the supporting plate 17 with the connecting member 26. The blow striking hammer 25 comprises a protrusion 27 radially outwardly projecting from the radially outer end of the connecting member 26, a blow portion 28 formed at the radially inner end thereof, and a connecting portion 29 made of a resilient material such as rubber and positioned between the protrusion 27 and the blow striking portion 28 to be connected with the connecting member 26. The protrusion 27 includes a tapered portion 27a radially outwardly tapered and made of a resilient material such as rubber, and an extending portion 27b also made of a resilient material such as rubber and radially extending to be connected with the radially inner end of the tapered portion 27a and formed smaller in a cross-section than the tapered portion 27a. The tapered portion 27a, the extending portion 27b and the connecting portion 29 is formed integrally with each other by a method of simultaneous vulcanization. The reference numeral 30 indicates an embedded member made of a metal and comprising a flat portion 31, and a vertical portion 32 vertically extending from one end of the flat portion 31 so as to be formed in a L-shape. The flat portion 31 of the embedded member 31 is embedded in the radially inner end portion of the tapered portion 27a and the vertical portion 32 thereof is also embedded in the extending portion 27b and the connecting portion 29. The vertical portion 32 is formed with an aperture 32a which permits the resilient material to be entered therein so that the embedded member 30 and the connecting member 26 are firmly connected with each other. The embedded member 30 has such a strength as to be plastic deformed and bent when the tapered portion 27a is brought into engagement with and pressurized by the inner face of the pneumatic tire 8. To meet such requirement, the cross-section of the embedded member 30 has a cross-section area preferably ranging from 20 mm$^2$ to 240 mm$^2$. The radially inner end portion of the vertical portion 32 of the embedded member 30 serves as the foregoing blow portion 28. On the face of the rim well portion 6 opposing the blow portion 28 is welded a metal fixed base 33 to the radially outer face of which is an anvil base 35 attached by means of a screw 34.

Figure 5:
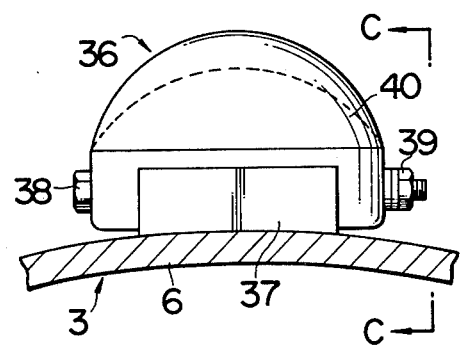
FIG. 5 is an elevational view of a balance weight.
Figure 6:
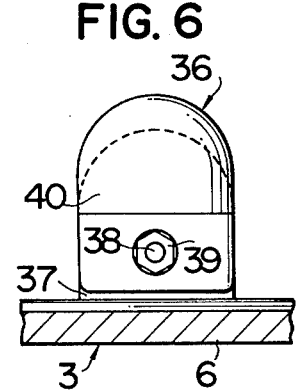
FIG. 6 is a side view as seen from the lines C—C of FIG. 5.

Referring again to FIG. 1, a balance weight 36 is provided on the outer face of the rim well portion 6 distant 180 degrees from the tire pressure drop alarming apparatus 14 and positioned adjacent to the bead seat 4 of the rim well portion 6 so as to enable the pneumatic tire 8 to be easily assembled with and disassembled from the wheel rim 1. The balance weight 36 is particularly illustrated in FIGS. 5 and 6 to comprise a bracket 37 secured to the outer face of the rim well portion 6, and a weight 40 detachably secured to the bracket 37 by means of a bolt 38 and a nut 39. The balance weight 36 weighs substantially equal to the tire pressure drop alarming apparatus 14.

The operation of the apparatus thus constructed above will now be described hereinafter.

When an automobile, which is assembled with the pneumatic tire 8 having a normal inner pressure within the air chamber 15, runs on roads, there occurs no oscillation on the wheel rim 1 since the tire pressure drop alarming apparatus 14 is balanced with the balance weight 36. At this time, the radially outer end of the tapered portion 27a of the blow hammer 25 is spaced a predetermined distance from the inner face of the tread portion 12 of the pneumatic tire 8 as shown in full lines in FIG. 1. If the automobile runs at a high speed under these conditions, the blow hammer 25 may be radially outwardly moved by its centrifugal force to deform the connecting member 26, thereby resulting in a possibility of causing no alarming operation by the pressure drop alarming apparatus 14. For avoiding such a condition, it is preferable that hardness of the connecting member 26 ranges 40 to 70 in shore hardness.

When the inner pressure of the air chamber 15 of the pneumatic tire 8 is then dropped by a certain reason such as puncture, the tread portion 12 of the pneumatic tire 8 commences to be deformed. When the inner pressure of the air chamber 15 is then further dropped to its lower limit, the pneumatic tire 8 is deflected to bring the inner face of the tread portion 12 into pressurized engagement with the radially outer end of the tapered portion 27a of the blow hammer 25. The engagement occurs periodically as the automobile runs on the roads and causes the blow hammer 25 to be moved radially inwardly so that the blow portion 28 strikes the wheel rim 1 through the anvil base 35 and the fixed base 33. As a result, there occurs from the wheel rim 1 oscillation and blow sound which enable a driver to perceive the abnormal pressure drop of the pneumatic tire 8. At this time, the blow hammer 25 receives three dimentional external forces in the vertical direction, the front and rear direction, and the right and left direction of the automobile so that the blow hammer 25 effects a precession motion around the center of the connecting portion 29. The precession motion of the blow hammer 25 is absorbed in the connecting member 26 since the connecting member 26, which extends circumferentially and is made of a resilient material, receives bending deformation and shearing deformation. For this reason, the blow portion 28 is moved in the radial direction even if the tapered portion 27a is displaced in any directions so that the blow portion 28 reliably strikes the anvil base 35. At this time, the tapered portion 27a of the blow hammer 25 does not damage the inner surface of the treat portion 12 even if the tapered portion 27a is brought into friction contact with the inner surface of the tread portion 12 since the tapered portion 27a is made of a resilient material.

When the inner surface of the tread portion 12 is brought into friction contact with the blow hammer 25 predetermined times in this way, the embedded member 30 can no longer endure the external force and is finally plastic deformed around the extending portion 27b to be bent as shown in phantom line in FIG. 2. At this time, the embedded member 30 is always bent around the extending portion 27b since the extending portion 27b is smaller in cross-section than the radially inner end of the tapered portion 27a. The bending deformation of the embedded member 30 causes the protrusion 27 to be lowered in height so that an excessive force does not act upon the connecting member 26 during the bending deformation of the embedded member 30, thereby preventing early breakage of the connecting member 26. When the inner pressure of the air chamber 15 is then further dropped to a predetermined pressure, the annular reinforcing portions 13 and 13' support the weight of the automobile to prevent the pneumatic tire 8 from being further deflected. Under these conditions, blow sound is also generated at every time when the inner surface of the tread portion 12 is brought into engagement with the blow hammer 25. When the inner surface of the tread portion 12 is then brought into engagement with the blow hammer 25 predetermined times, the connecting member 26 is fatigued by the shearing and bending deformations of the precession motion of the blow hammer 25 and then finally brocken at its most fatigued portion to stop the blow sound. The blow hammer 25 and the connecting member 26 which are separated from the securing member 24 due to the breakage of the connecting member 26 continue to be rolled within the air chamber 15 during running of the automobile and collide with the inner surface of the pneumatic tire 8 and the outer surface of the wheel rim 1. However, the inner surface of the pneumatic tire 8 and the outer surface of the wheel rim 1 will not be damaged by the separated blow hammer 25 and connecting member 26 by the reason that the blow hammer 25 is constituted by the protrusion 27 and the connecting portion 29 which are made of a resilient material and that the securing member 24 is constituted by the connecting member 26 which is also made of a resilient material.

Figure 7:
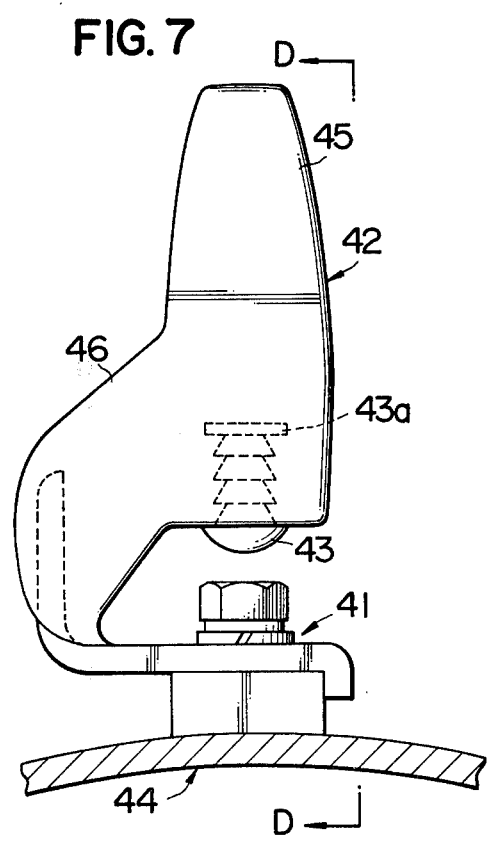
FIG. 7 is an elevational view of another embodiment of the tire pressure drop alarming apparatus according to the present invention.
Figure 8:
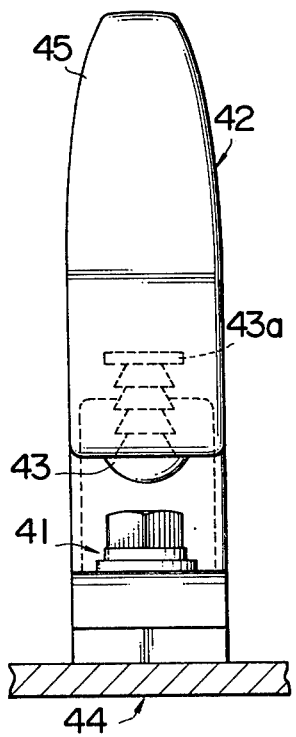
FIG. 8 is a side view as seen from the lines D—D of FIG. 7.

While there has been disclosed in the previously mentioned embodiment only one tire pressure drop alarming apparatus 14 provided in the air chamber 15, a plurality of tire pressure drop alarming apparatuses may be provided in the air chamber 14 according to the present invention. If an odd number of tire pressure drop alarming apparatuses 14 are provided in the air chamber 15, the same number of balance weights 36 as the tire pressure drop alarming apparatuses 14 may preferably be arranged at positions spaced 180 degrees from the respective alarming apparatuses 14. Further, the blow hammer 25 may be provided spacedly from the securing member 24 in the axial direction of the wheel rim 1 according to the present invention. It is required that the blow hammer 25 be provided spacedly from the securing member 24 in the direction substantially perpendicular to the radial direction of the wheel rim 1 according to the present invention. A securing member 41 may serve as the anvil base 35 and the fixed base 33, and a metal blow device 43 having a disc portion 43a may be embedded in the radially inner end of a blow hammer 42 to enhance propagation efficiency of external forces so as to enable the blow device 43 to strike a wheel rim 44 through a securing member 41, emitting an alarming sound when the inner pressure of the air chamber 15 drops below the allowable predetermined pressure limit as shown in FIGS. 7 and 8 according to the present invention. A protrusion 45 may be vulcanized simultaneously with a connecting member 46 to have the same resilient material as that of the connecting member 46 as shown in FIGS. 7 and 8 according to the present invention.

Although particular embodiments of the present invention have been shown and described, it will be obvious to those skilled in the art that various changes and modifications may be made without departing from the spirit and scope of the present invention.

What is claimed is:

1. A tire pressure drop-warning apparatus for a vehicle, which apparatus is provided in an air chamber defined by a pneumatic tire and a wheel rim assembled with said pneumatic tire so as to mechanically strike said wheel rim for emitting an alarm-giving sound when the tire inner pressure drops in said air chamber below an allowable limit, comprising in combination:

a securing member secured to said wheel rim;

a blow-striking hammer provided spacedly from said securing member in the direction perpendicular to the radial direction of said wheel rim; and a connecting member made of a resilient material and having one end connected with the radially outer end of said securing member and the other end connected with said blow-striking hammer;

said blow-striking hammer having at its radially outer end a protrusion extending radially outwardly from the radially outer end of said connecting member said blow-striking hammer having at its radially inner end a blow-striking portion for striking said wheel rim, so that when the wheel is rotated in use the inner surface of said pneumatic tire is periodically brought into pressed engagement with the radially outer end of said protrusion if when said tire inner pressure is dropped in said air chamber below said allowable limit the connecting member is thereby caused to be shearingly and bendingly deformed so that the blow-striking portion will strike said wheel rim to themselves alone emit said alarm-giving sound discernable over other noises of said vehicle.

2. A tire pressure drop-warning apparatus as set forth in claim 1, wherein said protrusion of said blow-striking hammer is made of a resilient material which is the same as that of said connecting member.

3. A tire pressure drop-warning apparatus as set forth in claim 1, wherein said protrusion of said blow-striking hammer includes a tapered portion that is radially outwardly tapered and made of a resilient material, an extending portion also made of a resilient material and radially extending to be connected with the radially inner end of said tapered portion and which is smaller in cross-section than said tapered portion, and an embedded member embedded in said extending portion and having such a strength as to be plastically deformed and bent when said inner surface of said pneumatic tire is brought into pressed engagement with said protrusion of said blow-striking hammer.

4. A tire pressure drop-warning apparatus as set forth in claim 1, wherein said blow-striking portion of said blow-striking hammer is made of a metal.

* * * * *